(12) United States Patent
Goodson et al.

(10) Patent No.: US 9,520,935 B2
(45) Date of Patent: Dec. 13, 2016

(54) WIRELESS AUDIO RECEIVER SYSTEM AND METHOD

(71) Applicant: Shure Acquisition Holdings, Inc., Niles, IL (US)

(72) Inventors: Michael J. Goodson, Bloomingdale, IL (US); Tom Kundmann, Oakwood Hills, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 396 days.

(21) Appl. No.: 13/875,679

(22) Filed: May 2, 2013

(65) Prior Publication Data
US 2014/0270008 A1    Sep. 18, 2014

Related U.S. Application Data

(60) Provisional application No. 61/800,364, filed on Mar. 15, 2013.

(51) Int. Cl.
*H04B 7/08* (2006.01)

(52) U.S. Cl.
CPC .............. *H04B 7/08* (2013.01); *H04B 7/0817* (2013.01); *H04B 7/0871* (2013.01)

(58) Field of Classification Search
CPC ..... H04B 1/006; H04B 7/0817; H04B 7/0871; H04B 7/0877; H04B 7/088; H03D 7/165
See application file for complete search history.

(56) References Cited

U.S. PATENT DOCUMENTS 6,141,536 A    10/2000   Cvetkovic et al.
7,034,898 B1 *  4/2006   Zahm .................. H04B 7/082
                                                348/725

(Continued)

FOREIGN PATENT DOCUMENTS

EP    1126632 A1    4/2004
EP    1126632 B1    4/2004

(Continued)

OTHER PUBLICATIONS

Pending U.S. Appl. No. 13/875,688, filed May 2, 2013, pp. 1-27.

(Continued)

*Primary Examiner* — Daniel Washburn
*Assistant Examiner* — Eboni Hughes
(74) *Attorney, Agent, or Firm* — William J. Lenz, Esq.; Neal, Gerber & Eisenberg LLP

(57) ABSTRACT

A wireless audio receiver system and method is provided that is capable of receiving one or more radio frequency (RF) signals containing audio signals modulated by analog and/or digital modulation schemes, operating in full diversity mode or switched diversity mode, demodulating the RF signals, and outputting analog audio signals and a combined digital audio signal. The system and method switches multiple diversity antennas to route received RF signals to respective RF signal processing paths. Digitized passband modulated signals are demodulated to generate analog audio signals, and a combined digital audio signal with one or multiple channels may also be generated. The system and method are capable of demodulating signals modulated using a wide variety of modulation schemes. Reconfigurable computing components are utilized to demodulate digitized passband modulated signals and generate the analog audio signals and combined digital audio signal.

20 Claims, 9 Drawing Sheets

(56) References Cited

U.S. PATENT DOCUMENTS

| | | | |
|---|---|---|---|
| 8,463,220 B2* | 6/2013 | Lindenbauer | H04L 25/03006 455/101 |
| 2002/0173337 A1* | 11/2002 | Hajimiri et al. | 455/552 |
| 2008/0200137 A1* | 8/2008 | Adam | H04B 7/082 455/161.3 |
| 2011/0210787 A1* | 9/2011 | Lee | H03F 1/56 330/126 |
| 2013/0016647 A1* | 1/2013 | Marco et al. | 370/312 |
| 2014/0270008 A1* | 9/2014 | Goodson | H04B 7/08 375/340 |

FOREIGN PATENT DOCUMENTS

| | | | |
|---|---|---|---|
| EP | 1583249 A1 | 10/2005 | |
| EP | 2207273 A1 | 7/2010 | |

OTHER PUBLICATIONS

International Search Report and Written Opinion from corresponding international patent application No. PCT/US2014/021768, dated Mar. 6, 2014, 11 pages.

* cited by examiner

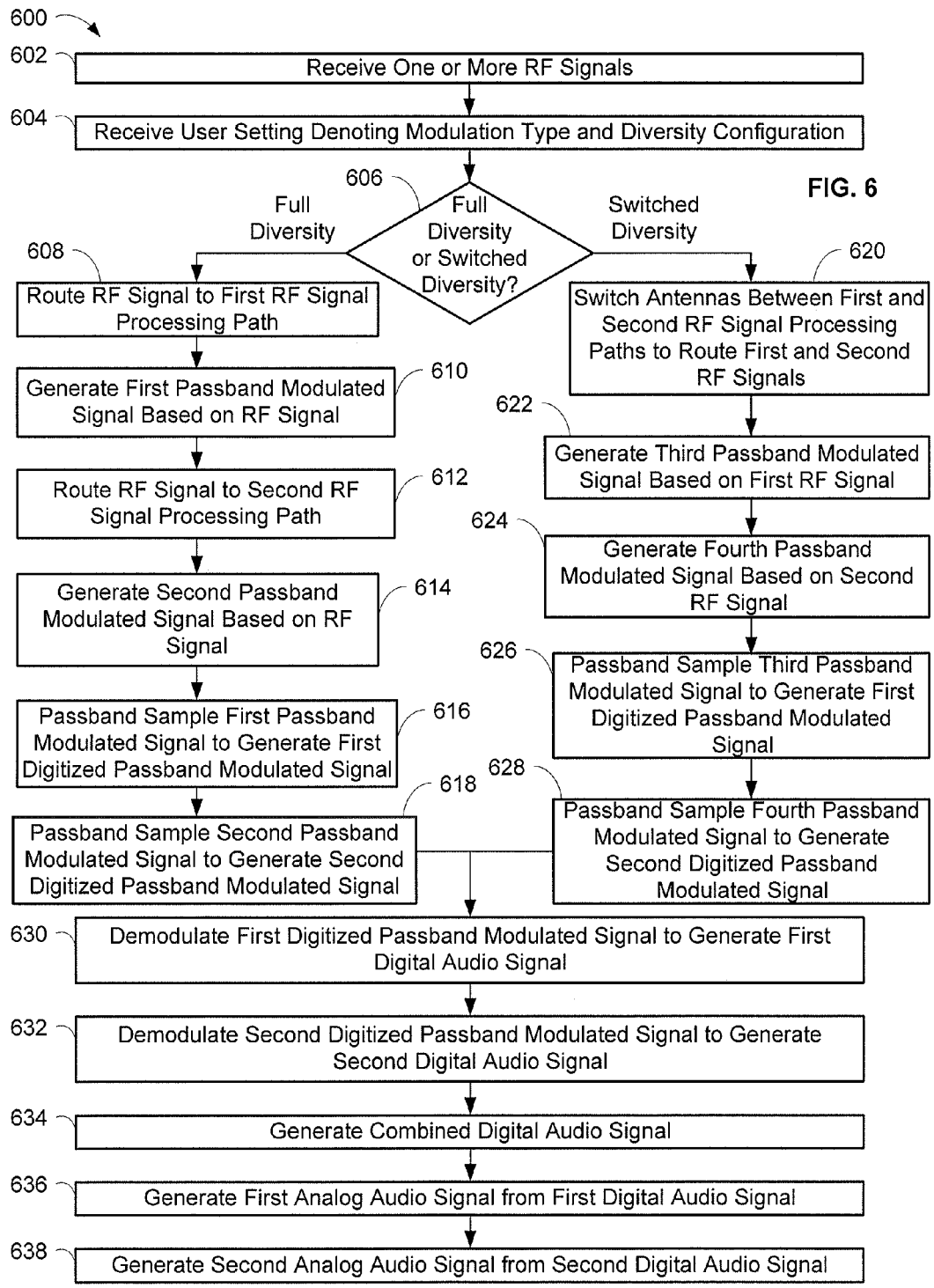

WIRELESS AUDIO RECEIVER SYSTEM AND METHOD

CROSS-REFERENCE TO RELATED APPLICATION

This application claims the benefit of U.S. Provisional Patent Application No. 61/800,364, filed on Mar. 15, 2013, the contents of which are fully incorporated herein by reference.

TECHNICAL FIELD

This application generally relates to a wireless audio receiver system and method. In particular, this application relates to a wireless audio receiver system and method capable of receiving one or more radio frequency (RF) signals containing audio signals modulated by analog and/or digital modulation schemes, operating in full diversity mode or switched diversity mode, demodulating the RF signals, and outputting analog audio signals and a combined digital audio signal.

BACKGROUND

Audio production can involve the use of many components, including microphones, wireless audio transmitters, wireless audio receivers, recorders, and/or mixers for capturing and recording the sound of productions, such as television programs, newscasts, movies, live events, and other types of productions. The microphones typically capture the sound of the production, which is wirelessly transmitted from the microphones and/or the wireless audio transmitters to the wireless audio receivers. The wireless audio receivers can be connected to a recorder and/or a mixer for recording and/or mixing the sound by a crew member, such as a production sound mixer. Electronic devices, such as computers and smartphones, may be connected to the recorder and/or mixer to allow the crew member to monitor audio levels and timecodes.

The crew member typically carries a bag that contains the wireless audio receivers, recorder, mixer, and a battery to power these components. It is not uncommon to have multiple wireless audio receivers that correspond to each microphone and/or wireless audio transmitter that is capturing the sound of a production. Each wireless audio receiver typically has a cable to transmit an audio signal to the recorder, and another cable to receive power from the battery. There are also cables from the battery to power the recorder and mixer. Because of the large number of cables, it can be time consuming to setup and connect the components, the possibility of problems is increased (e.g., due to faulty cables, loose connections, cable failures, etc.), and the weight of the bag can be uncomfortably heavy for the crew member. Wireless audio receivers may also be of a slot-type which allows insertion of the wireless audio receiver into a video camera for space-saving, power, and synchronization purposes.

Some existing wireless audio receivers can demodulate only analog modulated signals, while other existing wireless audio receivers can demodulate only digital modulated signals. However, existing wireless audio receivers cannot simultaneously demodulate an analog modulated signal and a separate digital modulated signal, and/or the existing wireless audio receivers exclude certain types of modulated signals from being received and demodulated. Furthermore, while some existing wireless audio receivers can receive one or multiple RF signals, these receivers typically cannot utilize multiple antennas for diversity purposes if only one RF signal is being received instead of multiple RF signals. Instead, these receivers utilize a single antenna for the one RF signal being received.

Accordingly, there is an opportunity for a system and method that address these concerns. More particularly, there is an opportunity for a wireless audio receiver system and method that is capable of receiving one or more RF signals containing audio signals modulated by analog and/or digital modulation schemes, operating in full diversity mode or switched diversity mode, demodulating the RF signals, and outputting analog audio signals and a combined digital audio signal.

SUMMARY

The invention is intended to solve the above-noted problems by providing systems and methods that are designed to, among other things: (1) utilize multiple diversity antennas to receive one or more RF signals that contain audio signals modulated using an analog modulation scheme and/or a digital modulation scheme; (2) operate in full diversity mode or switched diversity mode, depending on a user setting denoting number of channels, a modulation type of the RF signals, and/or a configuration to full diversity mode or switched diversity mode; (3) switching between antennas to route the multiple RF signals to respective RF signal processing paths, if configured to switched diversity mode; and (4) demodulating digitized passband modulated signals to generate an analog audio signal and a combined digital audio signal with one or multiple channels.

In an embodiment, a wireless audio receiver system may include first and second diversity antennas for receiving one or more of a first RF signal and a second RF signal. The first and second RF signals may each contain an audio signal modulated using an analog modulation scheme or a digital modulation scheme. An RF analog signal processing module may include a first RF signal processing path, a second RF signal processing path, and an antenna routing module. A user setting may denote a modulation type of the first and second RF signals and a configuration to full diversity mode or switched diversity mode. If the user setting denotes the configuration to full diversity mode, the antenna routing module may route the first RF signal to the first and second RF signal processing paths. In this case, the first RF signal processing path may generate a first passband modulated signal based on the first RF signal and the second RF signal processing path may generate a second passband modulated signal based on the first RF signal. If the user setting denotes the configuration to switched diversity mode, the antenna routing module may switch between the first and second diversity antennas to respectively route the first and second RF signals to the first and second RF signal processing paths based on an antenna switching algorithm. In this case, the first RF signal processing path may generate a third passband modulated signal based on the first RF signal and the second RF signal processing path may generate a fourth passband modulated signal based on the second RF signal.

A first analog to digital converter (ADC) may passband sample the first passband modulated signal, if in full diversity mode, to generate a first digitized passband modulated signal. The first ADC may passband sample the third passband modulated signal to generate the first digitized passband modulated signal, if in switched diversity mode. A second ADC may passband sample the second passband modulated signal, if in full diversity mode, to generate a second digitized passband modulated signal. The second ADC may passband sample the fourth passband modulated signal, if in switched diversity mode, to generate the second digitized passband modulated signal. A first digital signal processing (DSP) module may demodulate the first digitized passband modulated signal, based on the user setting, to generate a first digital audio signal, and a second DSP module may demodulate the second digitized passband modulated signal, based on the user setting, to generate a second digital audio signal. First and second digital to analog converters (DAC) may generate first and second analog audio signals from the first and second digital audio signals, respectively.

In another embodiment, a method of wirelessly receiving one or more of a first RF signal and a second RF signal includes receiving the one or more of the first and second RF signals. The first and second RF signals may each contain an audio signal modulated using an analog modulation scheme or a digital modulation scheme. A user setting may be received that denotes a modulation type of the first and second RF signals and a configuration to full diversity mode or switched diversity mode of a first RF signal processing path and a second RF signal processing path. If the user setting denotes the configuration to full diversity mode, the first RF signal may be routed to the first and second RF signal processing paths, a first passband modulated signal may be generated with the first RF signal processing path based on the first RF signal, and a second passband modulated signal may be generated with the second RF signal processing path based on the first RF signal. If the user setting denotes the configuration to switched diversity mode, the first and second diversity antennas may be switched between to respectively route the first and second RF signals to the first and second RF signal processing paths based on an antenna switching algorithm. In this case, a third passband modulated signal may be generated with the first RF signal processing path based on the first RF signal, and a fourth passband modulated signal may be generated with the second RF signal processing path based on the second RF signal.

If in full diversity mode, the first passband modulated signal may be passband sampled to generate a first digitized passband modulated signal, and the second passband modulated signal may be passband sampled to generate a second digitized passband modulated signal. If in switched diversity mode, the third passband modulated signal may be passband sampled to generate the first digitized passband modulated signal, and the fourth passband modulated signal may be passband sampled to generate the second digitized passband modulated signal. The first digitized passband modulated signal may be demodulated, based on the user setting, to generate a first digital audio signal. The second digitized passband modulated signal may be demodulated, based on the user setting, to generate a second digital audio signal. First and second analog audio signals may be generated from the first and second digital audio signals, respectively.

These and other embodiments, and various permutations and aspects, will become apparent and be more fully understood from the following detailed description and accompanying drawings, which set forth illustrative embodiments that are indicative of the various ways in which the principles of the invention may be employed.

BRIEF DESCRIPTION OF THE DRAWINGS

FIG. 6 is a flowchart illustrating operations for wirelessly receiving RF signals using the system of FIG. 1, in accordance with some embodiments.

DETAILED DESCRIPTION

Figure 1:
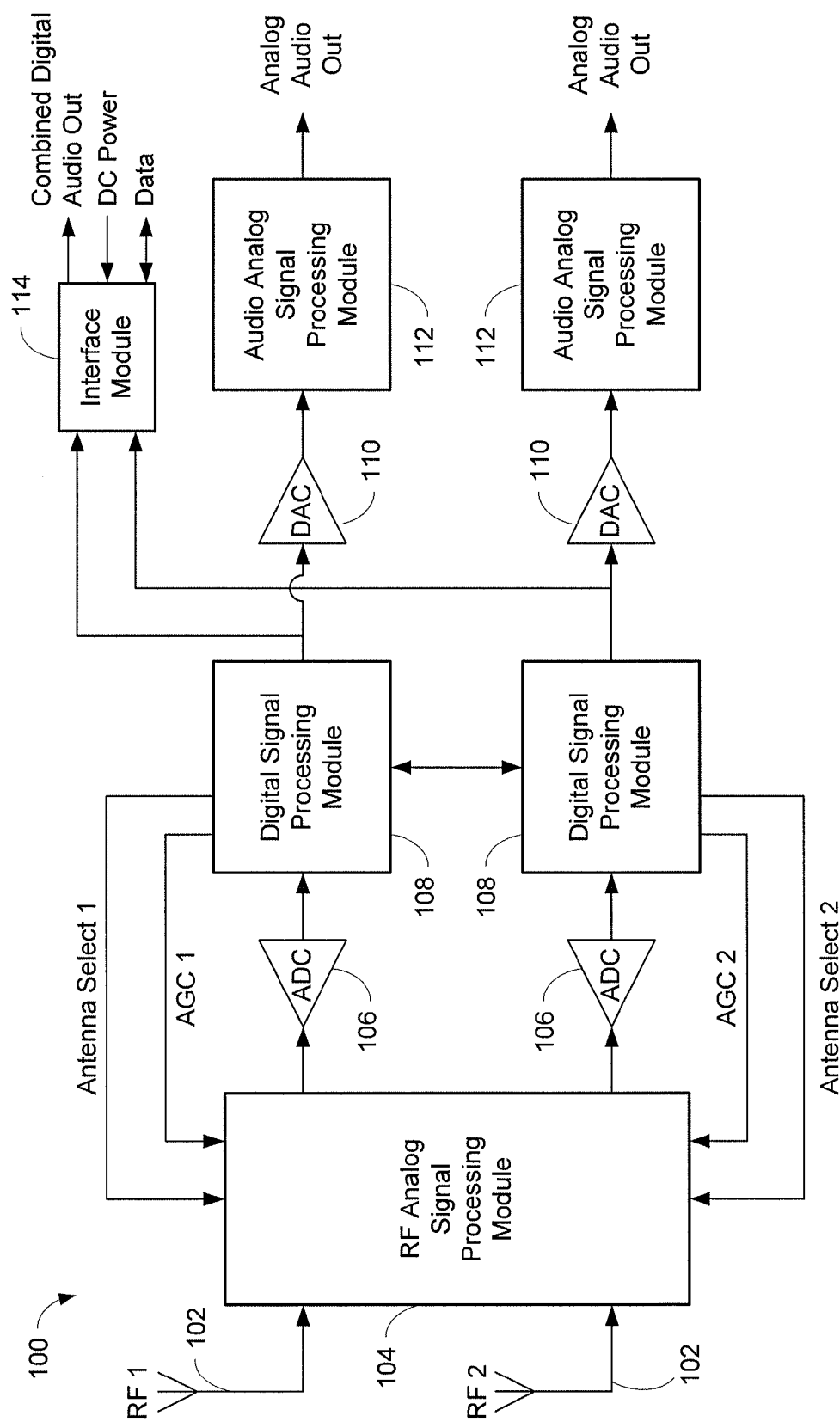
FIG. 1 is a block diagram of a wireless audio receiver system, in accordance with some embodiments.

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

FIG. 1 illustrates a block diagram of a wireless audio receiver system 100 for receiving one or more radio frequency (RF) signals containing audio signals modulated by analog and/or digital modulation schemes, operating in full diversity mode or switched diversity mode, demodulating the RF signals, and outputting analog audio signals and a combined digital audio signal. The system 100 may include multiple signal processing paths to flexibly route the RF signals in order to demodulate audio signals that have been modulated using a wide variety of modulation schemes. Moreover, the system 100 may digitize analog passband modulated signals derived from the RF signals so that signals modulated using a broader range of modulation types can be demodulated. In particular, analog passband modulated signals may be sampled as real passband signals instead of complex baseband signals in the system 100. Sampling complex baseband signals may lead to degraded performance with certain modulation types, due to mismatches in analog circuitry. The system 100 may further include reconfigurable computing components in digital signal processing modules 108 for demodulating digitized versions of the RF signals. In this way, the system 100 is capable of simultaneously demodulating an analog modulated signal and a digital modulated signal. Furthermore, when in full diversity mode and receiving a single RF signal, the system 100 can optimally utilize both antennas for diversity purposes.

The RF signals may be received from a wireless audio transmitter and/or a microphone, for example, that has captured the sound of a production. In particular, by utilizing two diversity antennas 102 and two parallel signal processing paths, the system 100 can be configured as a dual receiver for receiving two separate RF signals or as a single receiver for receiving a single RF signal. By utilizing multiple diversity antennas 102, the effects of multi-path propagation of the RF signal(s) may be minimized. A user setting may be received by the system 100 that denotes the modulation type of the RF signals and whether the system 100 is in full diversity mode (when one RF signal is being received) or switched diversity mode (when two different RF signals are being received). In some embodiments, the user setting may denote the number of RF signals being received, and the mode (full diversity or switched diversity) may be indirectly set from this. The user setting may be set through a configuration menu provided by the system 100 for allowing a user to set various configuration settings, for example. In some embodiments, the modulation type of the RF signals may be automatically sensed by the system 100. In other embodiments, the system 100 and a corresponding wireless audio transmitter may be synchronized so that the same frequency is coordinated between the components, as well as setting the modulation type and number of RF signals. For example, a user may have synchronized the system 100 and its corresponding wireless audio transmitter by physically lining up each component's infrared synchronization port and pressing a sync button.

The system 100 may be in switched diversity mode when configured as a dual receiver so that the diversity antennas 102 may each receive the two RF signals. For example, each of the two RF signals may be a frequency-divided signal that is band-limited. Both diversity antennas 102 can receive each of the RF signals but at any given time, only one diversity antenna 102 is connected to a particular signal processing path. In particular, independent antenna switching algorithms may select the proper diversity antenna 102 so that a particular RF signal is always routed to its particular signal processing path. In one example, both RF signals could be received at the same diversity antenna 102 but each individual RF signal is routed to the appropriate signal processing path. The switching between the diversity antennas 102 may be controlled by the antenna switching algorithms to optimize the diversity reception of the RF signals. The antenna switching algorithm may ensure that the respective RF signals are processed on parallel analog signal processing paths within the system 100, based on received signal metrics, for example.

When configured as a single receiver, the system 100 may be in full diversity mode so that a single RF signal is received by both diversity antennas 102. In particular, each diversity antenna 102 receives the same RF signal and the RF signal is processed separately within the system 100 in parallel analog signal processing paths and combined, such as in a digital signal processing module. In this case, the antenna switching algorithms may connect one of the diversity antennas 102 to one of the signal processing paths, and connect the other diversity antenna 102 to the other signal processing path.

As described above, the diversity antennas 102 may receive one or more RF signals that each contains a modulated audio signal. The diversity antennas 102 may be omnidirectional antennas or unidirectional antennas, for example. The audio signals contained in the RF signals may be modulated using an analog modulation scheme and/or a digital modulation scheme. Analog modulation schemes may include amplitude modulation, frequency modulation, phase modulation, proprietary analog modulation, and/or other schemes. Digital modulation schemes may include phase-shift keying, frequency-shift keying, amplitude-shift keying, quadrature amplitude modulation, proprietary digital modulation, and/or other schemes.

An RF analog signal processing module 104 in the system 100 may receive the RF signals from the diversity antennas 102 and generate passband modulated signals based on the RF signals. The RF signals may be in the frequency band from 470 MHz to 800 MHz, for example, and/or other frequency bands. The passband modulated signals may be shifted to an intermediate frequency (IF), such as 246 MHz, for example, by the module 104. Other suitable IFs may be utilized. The module 104 may include two parallel RF signal processing paths for processing the received RF signals, and an antenna routing module for routing the RF signals for processing depending on whether the system 100 is in full diversity mode or switched diversity mode. In full diversity mode, the RF signal processing paths may generate two passband modulated signals based on the single received RF signal. In switched diversity mode, the RF signal processing paths may generate two passband modulated signals based respectively on the two received RF signals. Antenna select signals may be received by the module 104 from the DSP modules 108 to control switches within the antenna routing module. The antenna select signals may be generated by the DSP modules 108 based on an antenna switching algorithm. Automatic gain control (AGC) signals may also be received by the module 104 from the DSP modules 108 to adjust the gain of the analog signals within the module 104 with a variable attenuator, as appropriate. Further details of the RF analog signal processing module 104 are described below with respect to FIGS. 2 and 3.

The analog passband modulated signals may be converted to digitized passband modulated signals by analog to digital converters (ADC) 106. The ADCs 106 may passband sample the analog passband modulated signals to generate the digitized passband modulated signals. In particular, the ADCs 106 may sample the analog passband modulated signals (that are at the IF) at a sampling rate of 64 mega samples per second (MSPS), for example. Other suitable sample rates may be utilized. In the example of sampling at 64 MSPS of the analog passband modulated signals (at an IF of 246 MHz), the analog passband modulated signals may be oversampled to improve resolution and reduce noise.

The digitized passband modulated signals may be received by the DSP modules 108 and demodulated to generate two digital audio signals. The DSP modules may also generate antenna select signals and AGC signals for use in the RF analog signal processing module 104. When the system 100 is in full diversity mode, the DSP modules 108 may be in communication with one another to combine, sum, and/or otherwise process the digital audio signals to account for the diversity effects of the RF signal being received at the diversity antennas 102, and to generate a single digital audio signal. In some embodiments, the DSP modules 108 may process the digitized passband modulated signals, e.g., prior to demodulation, to account for the diversity effects.

A combined digital audio signal that includes the two digital audio signals, e.g., two channels, may be generated by an interface module 114. If in full diversity mode (with one received RF signal), the combined audio signal may consist of one digital audio signal, e.g., one channel. The digital audio signals may be received by the interface module 114 from the respective DSP modules 108. The combined digital audio signal may conform to the Audio Engineering Society AES3 standard, for example. The AES3 standard defines a self-clocking interface that can handle up to 96 kHz, 24-bit stereo audio. In some embodiments, the combined digital audio signal may be 48 kHz, 24-bit stereo audio. In other embodiments, the combined digital audio signal may have a different sampling rate, may be encoded with a different number of bits, and/or may have mono audio. Other suitable standards may also be utilized for the combined digital audio signal. The combined digital audio signal may be output, for example, on an XLR connector output, through a cable connected to the interface module 114 (described below), or on other suitable types of outputs.

In one embodiment, the DSP modules 108 may each include parallel demodulation modules that are each adapted to demodulate signals that have been modulated using a specific modulation scheme. The digital audio signals may be selected for output through a multiplexer unit, based on the user setting denoting the modulation type of the RF signals and the diversity configuration. Further details of this embodiment are described below with respect to FIG. 4. In another embodiment, the DSP modules 108 may each include a DSP processing engine that is adapted to demodulate signals according to commands in opcode files stored in a memory. Each of the opcode files may be specific to demodulating signals that have been modulated using a specific modulation scheme. The digital audio signals may be output from the DSP processing engine based on the user setting denoting the modulation type of the RF signals and the diversity configuration. Further details of this embodiment are described below with respect to FIG. 5.

The digital audio signals from the DSP modules 108 may be converted to analog audio signals by digital to analog converters (DAC) 110. In some embodiments, audio analog signal processing modules 112 may further process the analog audio signals prior to being output from the system 100. The audio analog processing modules 112 may perform audio band filter, signal power amplification, and/or other types of analog processing, for example. The analog audio signals may be output on two separate XLR connector outputs, for example, or on other suitable types of outputs.

The system 100 may also include an interface module 114 configured to connect with a cable adapted to simultaneously transport the combined digital audio signal, a DC power signal, and a data signal. The cable may network the system 100 with external entities, such as a gateway interconnection device or a wireless access point. The system 100 may transmit the combined digital audio signal on the cable, receive the DC power signal from an external entity, and transceive the data signal with the external entity. The cable may be, for example, a Category 5 unshielded twisted-pair cable that includes RJ45 connectors for connecting to an RJ45 port on the system 100. The audio signal may confirm to the AES3 standard, as described above. The data signal may conform to the EIA-485 standard for bi-directional serial data communication, and may include commands, statuses, and/or other information sent and received from the system 100 to the external entity for monitoring and control purposes, for example. The information within the data signal may conform to the ANSI E1.17 2006 Architecture for Control Networks (ACN) standard that is maintained by the American National Standards Institute (ANSI) that defines protocols for controlling and managing various devices. The DC power signal may be based on aspects of the Power over Ethernet (PoE) standard, and the interface module 114 may provide the DC power signal to the module 104, ADCs 106, DSP modules 108, DACs 110, and/or audio analog signal processing modules 112. Embodiments of a portable audio networking system that can include the system 100 are disclosed in a concurrently-filed commonly-assigned patent application, titled "Portable Audio Networking System", which is hereby incorporated by reference in its entirety.

In some embodiments, the system 100 may be constructed as a bag-type receiver or a slot-type receiver. The housing containing the system 100 may be constructed of metal for durability and be water resistant, such as with an IP3 liquid ingress protection rating. In embodiments, the system 100 may include a 128×64 pixel dot matrix display for displaying various information, full audio meters, and record indicators. The system 100 may also include control switches and/or buttons for control and setting of configuration options. The diversity antennas 102 may be whip antennas or other suitable types of antennas, and be connected via SMA (SubMiniature version A) coaxial connectors or other suitable connectors.

The system 100 may be powered by an internal rechargeable lithium-ion battery, alkaline batteries, and/or through a cable connected to the interface module 114 as described above. The system 100 may include a Universal Serial Bus (USB) connector for updating firmware of the system 100, transferring files to and from the system 100, recharging the internal battery, and/or other functions. In some embodiments, the system 100 may be capable of recording audio signals to flash memory, such as in 24-bit two channel WAV files or other suitable file types. In the case where the system 100 is constructed as a slot-type receiver, the system 100 may be inserted into a video camera and include a word clock input for synchronization compatibility with certain types of video cameras.

Figure 2:
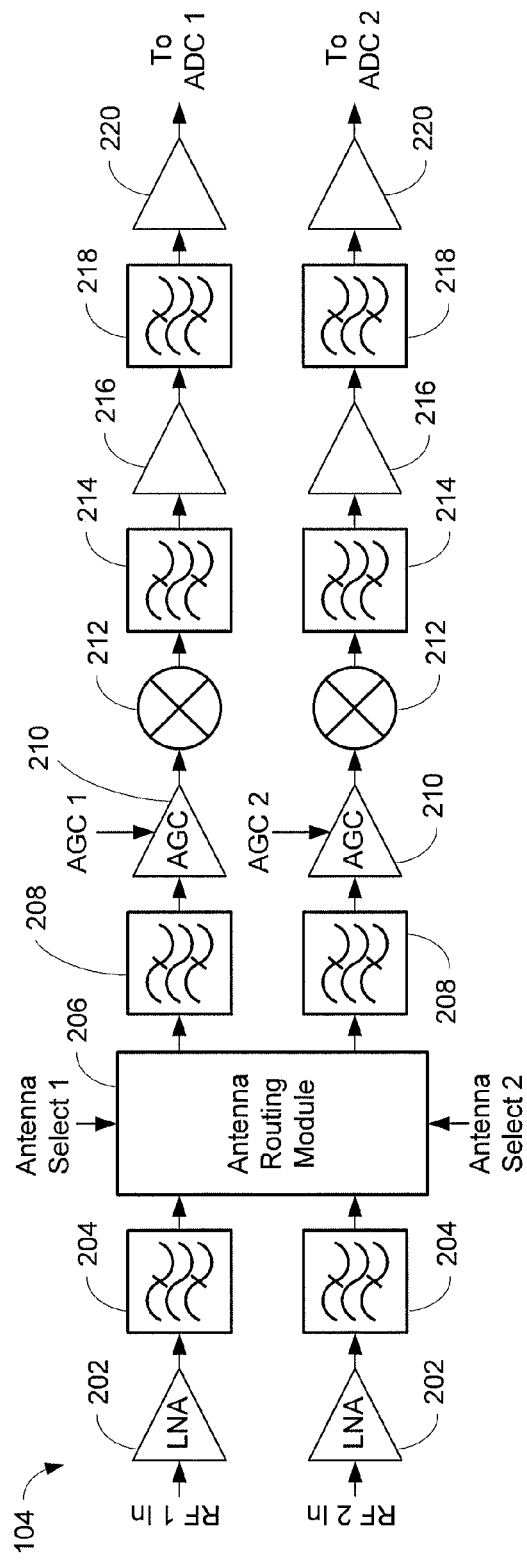
FIG. 2 is a block diagram of an RF analog signal processing module of the wireless audio receiver system of FIG. 1, in accordance with some embodiments.

FIG. 2 illustrates a block diagram of an RF analog signal processing module 104 of the wireless audio receiver system 100 of FIG. 1. The module 104 may receive RF signals from diversity antennas 102 and generate passband modulated signals based on the RF signals. In particular, low noise amplifiers 202 may receive the RF signals from the diversity antennas 102 and generate amplified RF signals. The low noise amplifiers 202 may provide low noise gain to the RF signals, even if the RF signals are relatively weak. Bandpass filters 204 may receive the amplified RF signals and generate filtered amplified RF signals so that the appropriate frequency band of the RF signal is selected. For example, the bandpass filters 204 may pass a signal band from 24 MHz to 64 MHz, and/or other signal band ranges.

Figure 3:
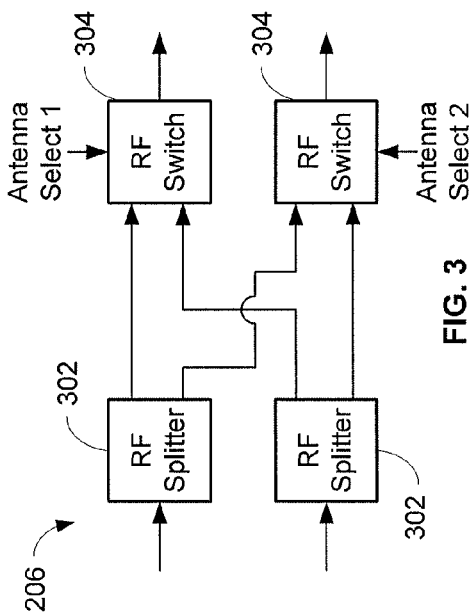
FIG. 3 is a block diagram of an antenna routing module of the RF analog signal processing module of FIG. 2, in accordance with some embodiments.

An antenna routing module 206 may utilize the antenna select signals generated by an antenna switching algorithm in the DSP modules 108 to switch the antennas between the first RF signal processing path and the second RF signal processing path, based on an antenna switching algorithm, to route the first and second filtered amplified RF signal. The filtered amplified RF signals may be switched depending on whether the system 100 is in full diversity mode or switched diversity mode. As shown in FIG. 3, the antenna routing module 206 may include RF splitters 302 and RF switches 304. The RF splitters 302 may split the filtered amplified RF signals into two identical signals that are routed to each of the RF switches 304. Accordingly, when the system 100 is in switched diversity mode, an RF switch 304 and downstream components in one of the signal processing paths of the module 104 processes one of the filtered amplified RF signals, and an RF switch 304 and downstream components in the other signal processing path of the module 104 processes the other filtered amplified RF signal. When in full diversity mode, the filtered amplified RF signals are not switched from their signal processing paths. Embodiments of the RF switches 304 are described in commonly-assigned U.S. Pat. Nos. 6,296,565 and 6,871,054, which are hereby incorporated by reference in their entirety.

Referring back to FIG. 2, the filtered amplified RF signals from the antenna routing module 206 may be further filtered using tunable image reject filters 208 to generate image-rejected RF signals. The image reject filters 208 may attenuate the filtered amplified RF signals at certain image frequencies. In particular, it may be desirable to utilize the image reject filters 208 to band limit the signal as much as possible prior to utilizing mixers 212 (described below), due to the mixing products that may result when multiple signals are present to the mixers 212. For example, an image frequency is a first order mixing product that can be filtered using the image reject filters 208. The image reject filters 208 may be tunable using varactor diodes as variable capacitors, or PIN diodes to switch in reactive components, for example.

The image-rejected RF signals may be received by variable attenuators 210 that enable automatic gain control based on AGC signals received from the DSP modules 108. The AGC signal may enable the variable attenuators 210 to adjust the gain of the filtered amplified RF signals, as appropriate. For example, the variable attenuators 210 may adjust the gain of the filtered amplified RF signals because certain analog signal processing components of the system 100, e.g., the ADCs 106, may not be able to cover the full dynamic range of the system 100.

Mixers 212 may heterodyne the attenuated image-rejected RF signals from the variable attenuators 210 and generate intermediate frequency (IF) signals. The mixers 212 may shift the frequency of the attenuated image-rejected RF signals to an IF of 246 MHz, for example. Signals at appropriate frequencies from local oscillators (not shown) may be applied to the mixers 212 to shift the frequency of the attenuated image-rejected RF signals to the IF signals. The IF signals may be processed by IF filters 214, IF amplifiers 216, IF filters 218, and IF amplifiers 220 to ultimately generate passband modulated signals from the IF signals. The IF filters 214, 218 may provide adjacent channel rejection and anti-alias rejection prior to the passband modulated signals being transmitted to the ADCs 106. The IF amplifiers 216, 220 may provide the necessary gain to allow the passband modulated signals to drive the ADCs 106 to their full scale ranges. In some embodiments, the IF filters 214, 218 may be narrowband surface acoustic wave (SAW) filters tuned to the IF of 246 MHz.

Figure 4:
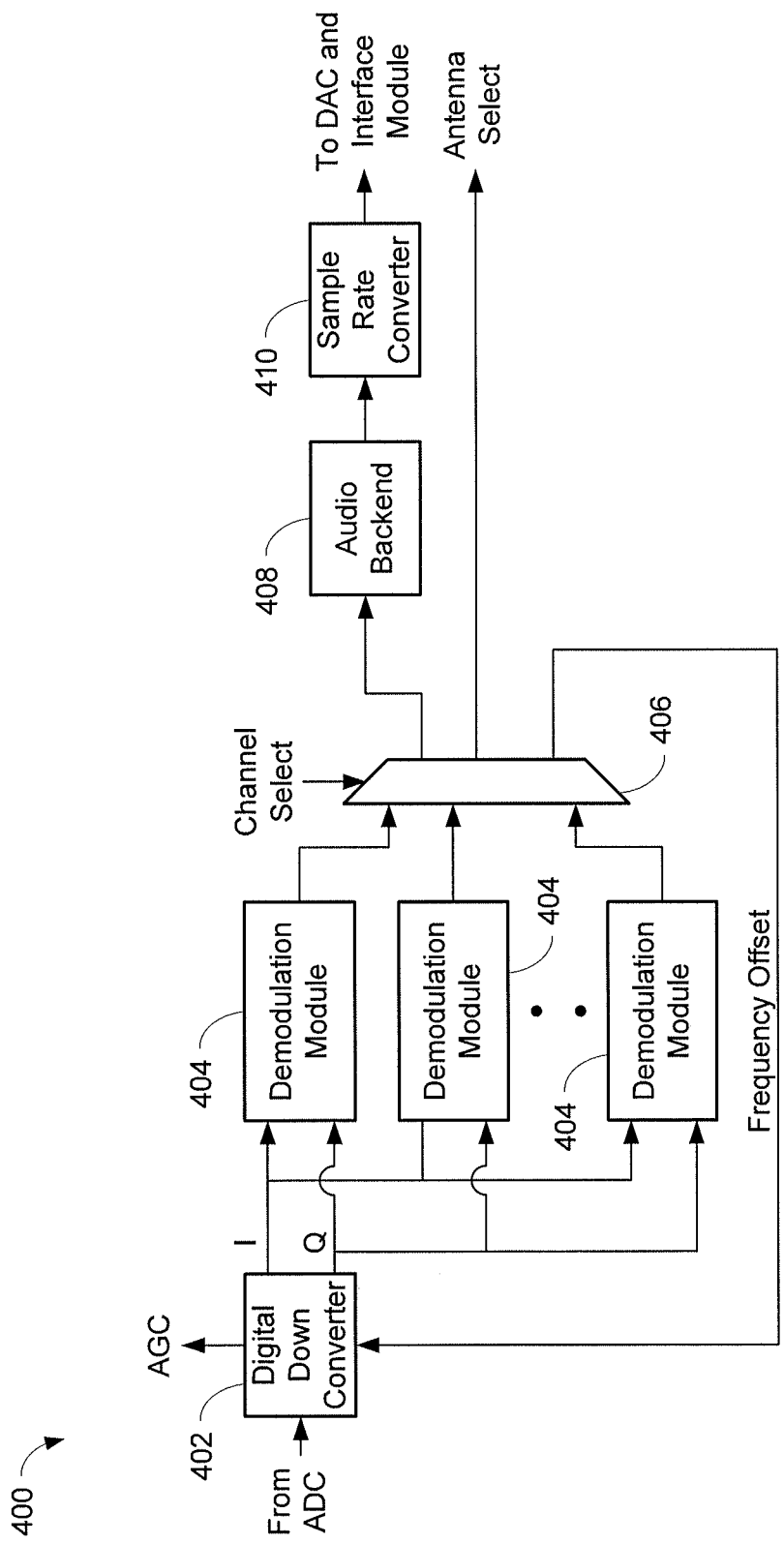
FIG. 4 is a block diagram of an embodiment of a digital signal processing module of the wireless audio receiver system of FIG. 1, in accordance with some embodiments.

FIG. 4 illustrates a block diagram of an embodiment of a digital signal processing module 400 of the wireless audio receiver system 100 of FIG. 1. The DSP module 400 may correspond to one or both of the DSP modules 108 shown in the system 100, for example. The DSP module 400 may include parallel demodulation modules 404 that are each adapted to demodulate signals that have been modulated using a specific modulation scheme. A digitized passband modulated signal may be received by a digital down converter 402 in the DSP module 400 from an ADC 106. The digital down converter 402 may generate an in-phase (I) signal, a quadrature (Q) signal, and an AGC signal from the digitized passband modulated signal. The I and Q signals may be a basebanded complex signal centered at zero frequency that decimates the digitized passband modulated signal to a lower sampling rate.

A lower sampling rate may be desirable to efficiently utilize the digital logic in the DSP module 400. For example, if the real signal has a bandwidth of 200 kHz, then the minimal sampling rate of an ADC would be 400 kilo samples per second (KSPS). However, as described above, the ADCs 106 may sample the analog passband modulated signal at 64 MSPS for purposes of improving resolution and reducing noise during analog processing. Accordingly, lowering the sampling rate relative to its bandwidth can ease the demodulation of the digitized signal by the DSP module 400.

Each of the demodulation modules 404 in the DSP module 400 may perform demodulation of the I and Q signals transmitted to them by the digital down converter 402. The demodulation modules 404 may each generate a demodulated signal that is transmitted to a multiplexer unit 406. The multiplexer unit 406 may select the demodulated signal from the appropriate demodulation module 404 that is specific to the modulation scheme that modulated the RF signal. For example, if the RF signal being processed includes an audio signal modulated using digital 8PSK modulation, then only the demodulated signal from the digital 8PSK demodulation module 404 would be selected by the multiplexer unit 406. An antenna select signal may also be generated by the demodulation modules 404 based on an antenna switching algorithm. The demodulation modules 404 may also generate a frequency offset correction signal that is received by the digital down converter 402. The frequency offset correction signal may be utilized so that the digital down converter 402 is precisely tuned to the frequency of the received RF signal. The frequency offset correction signal may be needed to account for small frequency errors in the transmitted RF signal, local oscillators, and/or sample clocks.

A channel select signal that is based on the user setting denoting the modulation type of the RF signals and the diversity configuration, as described above, may be utilized as the select signal for the multiplexer unit 406. The multiplexer unit 406 may select the antenna select signal and frequency offset correction signal from the appropriate demodulation module 404 that is specific to the modulation scheme that modulated the RF signal. An audio backend 408 and a sample rate converter 410 may further process the demodulated signal and generate a digital audio signal that can be received by the DACs 110. The audio backend 408 may include functions such as filtering, gain, metering, and/or signal limiting, for example. The sample rate converter 410 may be utilized to reconcile the difference between a sample clock that samples the ADC 106 and a sample clock that samples the DAC 110. The sample clocks may be generated using different oscillators that can have some frequency error with respect to one another.

If in full diversity mode, a single digital audio signal may be generated from digitized passband modulated signals from multiple DSP modules. For example, the DSP modules may combine, sum, and/or otherwise process the digital audio signals to account for the diversity effects of the RF signal being received at the diversity antennas, and generate the single digital audio signal. In some embodiments, the DSP modules may process the digitized passband modulated signals, e.g., prior to demodulation, to account for the diversity effects.

Figure 5:
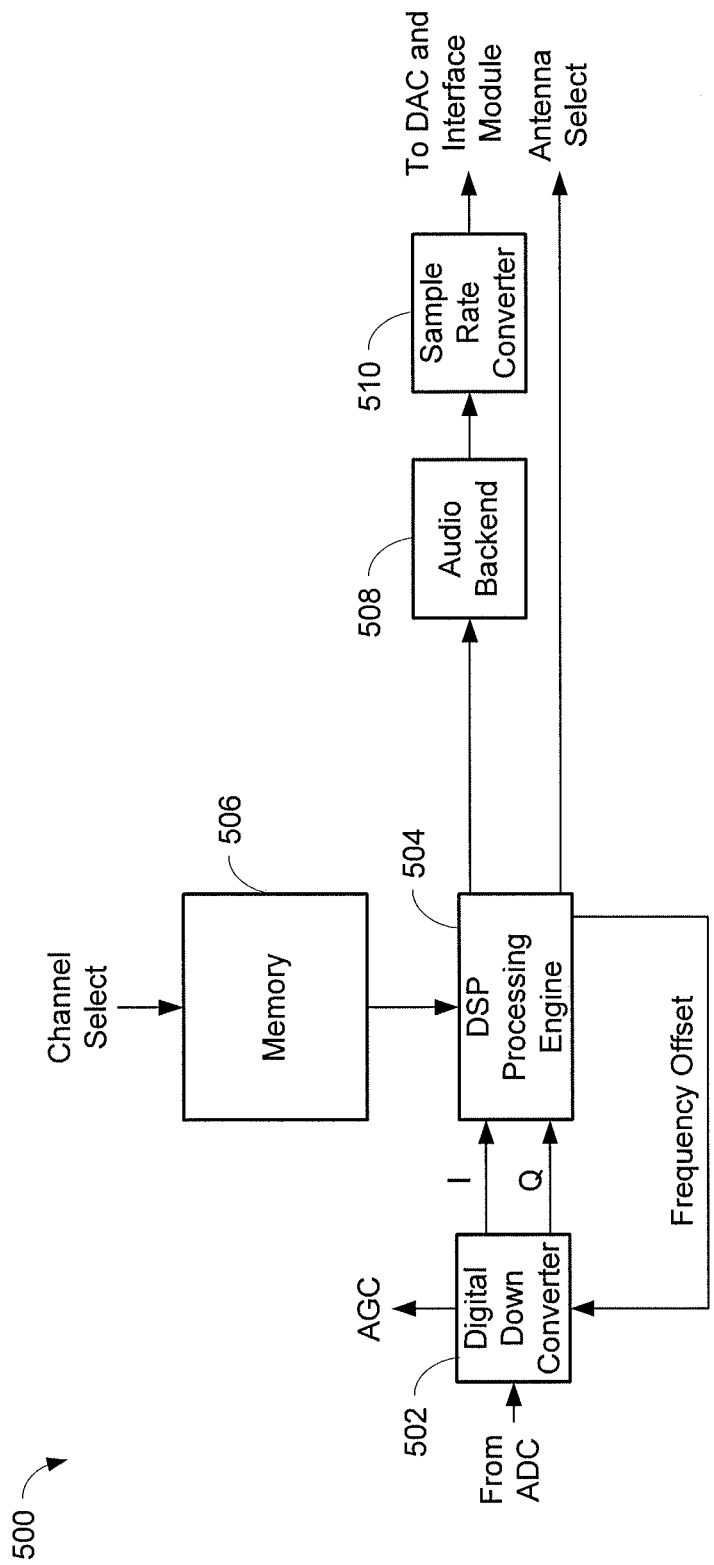
FIG. 5 is a block diagram of another embodiment of a digital signal processing module of the wireless audio receiver system of FIG. 1, in accordance with some embodiments.

FIG. 5 illustrates a block diagram of another embodiment of a digital signal processing module 500 of the wireless audio receiver system 100 of FIG. 1. The DSP module 500 may correspond to one or both of the DSP modules 108 shown in the system 100, for example. The DSP module 500 may include a DSP processing engine 504 that is adapted to demodulate signals according to commands in opcode files stored in a memory 506. Each of the opcode files may be specific to demodulate signals that have been modulated using a specific modulation scheme. A digitized passband modulated signal may be received by a digital down converter 502 from an ADC 106. The digital down converter 502 may generate an in-phase (I) signal, a quadrature (Q) signal, and an AGC signal from the digitized passband modulated signal. The I and Q signals may be a basebanded complex signal centered at zero frequency that decimates the digitized passband modulated signal to a lower sampling rate, as described above.

The DSP processing engine 504 may perform demodulation of the I and Q signals transmitted to it by the digital down converter 502. The opcode file read from the memory 506 by the DSP processing engine 504 can be selected based on a channel select signal so that that commands specific to demodulate the RF signal are utilized. The memory 506 may be a non-volatile read only memory, random access memory, and/or other suitable type of memory. The channel select signal may be based on the user setting denoting the modulation type of the RF signals and the diversity configuration, as described above. An antenna select signal may also be generated by the DSP processing engine 504 based on an antenna switching algorithm. The DSP processing engine 504 may generate a frequency offset correction signal that is received by the digital down converter 502. An audio backend 508 and a sample rate converter 510 may further process the demodulated signal, as described above, and generate a digital audio signal that can be received by the DACs 110.

If in full diversity mode, a single digital audio signal may be generated from digitized passband modulated signals from multiple DSP modules. For example, the DSP modules may combine, sum, and/or otherwise process the digital audio signals to account for the diversity effects of the RF signal being received at the diversity antennas, and generate the single digital audio signal. In some embodiments, the DSP modules may process the digitized passband modulated signals, e.g., prior to demodulation, to account for the diversity effects.

An embodiment of a process 600 for wirelessly receiving RF signals is shown in FIG. 6. The RF signals may contain audio signals modulated by analog and/or digital modulation schemes, and the process 600 may operate in a wireless audio receiver system 100, for example, to demodulate the RF signals and generate analog audio signals and/or a combined digital audio signal from the RF signals. The process 600 may be operated in full diversity mode (for receiving one RF signal) or switched diversity mode (for receiving two different RF signals). The process 600 may flexibly route the RF signals through parallel signal processing paths in order to demodulate the audio signals that have been modulated using a wide variety of modulation schemes. Moreover, analog passband modulated signals derived from the RF signals may be digitized in the process 600 so that signals modulated using a broader range of modulation types can be demodulated. The process 600 may also utilize reconfigurable computing components for demodulating the digitized versions of the RF signals.

At step 602, one or more RF signals may be received at one or more diversity antennas. The RF signals may have been transmitted from a wireless audio transmitter and/or a microphone, for example, that has captured the sound of a production. Multiple diversity antennas may help to minimize the effect of multi-path propagation of the RF signals. Each of the RF signals may contain a modulated audio signal that has been modulated using an analog modulation scheme and/or a digital modulation scheme. Analog modulation schemes may include amplitude modulation, frequency modulation, phase modulation, proprietary analog modulation, and/or other schemes. Digital modulation schemes may include phase-shift keying, frequency-shift keying, amplitude-shift keying, quadrature amplitude modulation, proprietary digital modulation, and/or other schemes.

A user setting may be received at step 604 that denotes the modulation type of the RF signals and whether the wireless audio receiver system is in full diversity mode or switched diversity mode. In some embodiments, the user setting may denote the number of RF signals being received, and the mode (full diversity or switched diversity) may be indirectly set from this. The user setting may be set through a configuration menu provided for allowing a user to set various configuration settings, for example. In some embodiments, the modulation type of the RF signals may be automatically sensed. In other embodiments, the wireless audio receiver system and a corresponding wireless audio transmitter may be synchronized so that the same frequency is coordinated between the components, as well as setting the modulation type and number of RF signals. When in switched diversity mode, the wireless audio receiver system may be configured as a dual receiver so that the diversity antennas may each receive the two RF signals. Both diversity antennas can receive each of the RF signals but at any given time, only one diversity antenna is connected to a particular signal processing path. The switching between the diversity antennas may be controlled by antenna switching algorithms that optimize the diversity reception of the RF signals. When in full diversity mode, the wireless audio receiver system may be configured as a single receiver so that a single RF signal is received by both diversity antennas.

It may be determined at step 606 whether the user setting has denoted that the wireless audio receiver system is in full diversity mode or switched diversity mode. If the wireless audio receiver system is in full diversity mode, then the process 600 may continue to step 608 to generate two passband modulated signals based on the single received RF signal. At step 608, the single RF signal may be routed to a first RF signal processing path, such as in an RF analog signal processing module. A first passband modulated signal may be generated at step 610 based on the single RF signal. At step 612, the single RF signal may be routed to a second RF signal processing path, such as in the RF analog signal processing module. A second passband modulated signal may be generated at step 614 based on the single RF signal. Embodiments of steps 610 and 614 for generating passband modulated signals are described below with respect to FIGS. 7A-7B. At step 616, a first digitized passband modulated signal may be generated by passband sampling the first passband modulated signal. A second digitized passband modulated signal may be generated at step 618 by passband sampling the second passband modulated signal. The respective passband modulated signals may be passband sampled and digitized by ADCs, for example.

However, if it is determined at step 606 that the wireless audio receiver system is in switched diversity mode, then the process 600 may continue to step 620 to generate two passband modulated signals based on the two received RF signals. At step 620, the antennas may be switched between the first RF signal processing path and the second RF signal processing path, based on an antenna switching algorithm, to route the first and second RF signals. In particular, both antennas can receive each of the RF signals but at any given time, only one diversity antenna is connected to a particular signal processing path. For example, the first RF signal (whether it is received at a first antenna or a second antenna) can always be routed to the first RF signal processing path, and the second RF signal (whether it is received at the first antenna or the second antenna) can always be routed to the second RF signal processing path. At step 622, a third passband modulated signal may be generated based on the first received RF signal, and at step 624, a fourth passband modulated signal may be generated based on the second received RF signal. Embodiments of steps 620, 622, and 624 for switching RF signals and generating passband modulated signals are described below with respect to FIGS. 7A-7B. At step 626, a first digitized passband modulated signal may be generated by passband sampling the third passband modulated signal. A second digitized passband modulated signal may be generated at step 628 by passband sampling the fourth passband modulated signal. The respective passband modulated signals may be passband sampled and digitized by ADCs, for example.

Following the generation of the first and second digitized passband modulated signals, the process 600 may continue to step 630. At step 630, the first digitized passband modulated signal may be demodulated to generate a first digital audio signal. The second digitized passband modulated signal may be demodulated at step 632 to generate a second digital audio signal. If in full diversity mode, a single digital audio signal may be generated from the first and second digitized passband modulated signals. For example, DSP modules may combine, sum, and/or otherwise process the digital audio signals to account for the diversity effects of the RF signal being received at the diversity antennas, and generate the single digital audio signal. In some embodiments, the DSP modules may process the digitized passband modulated signals, e.g., prior to demodulation, to account for the diversity effects.

A combined digital audio signal that consists of the first and second digital audio signals, e.g., two channels, may be generated at step 634. The combined digital audio signal may conform to the AES3 standard, for example. If in full diversity mode (with one received RF signal), the combined digital audio signal may consist of only one digital audio signal, e.g., one channel. A DSP module may perform steps 630 and 632, for example, and an interface module may perform step 634, for example. Embodiments of steps 630 and 632 are described below with respect to FIGS. 8A-8B and 9A-9B. At step 636, a first analog audio signal may be generated from the first digital audio signal, and at step 638, a second analog audio signal may be generated from the second digital audio signal. The respective analog audio signals may be generated by DACs, for example.

Figure 7A:
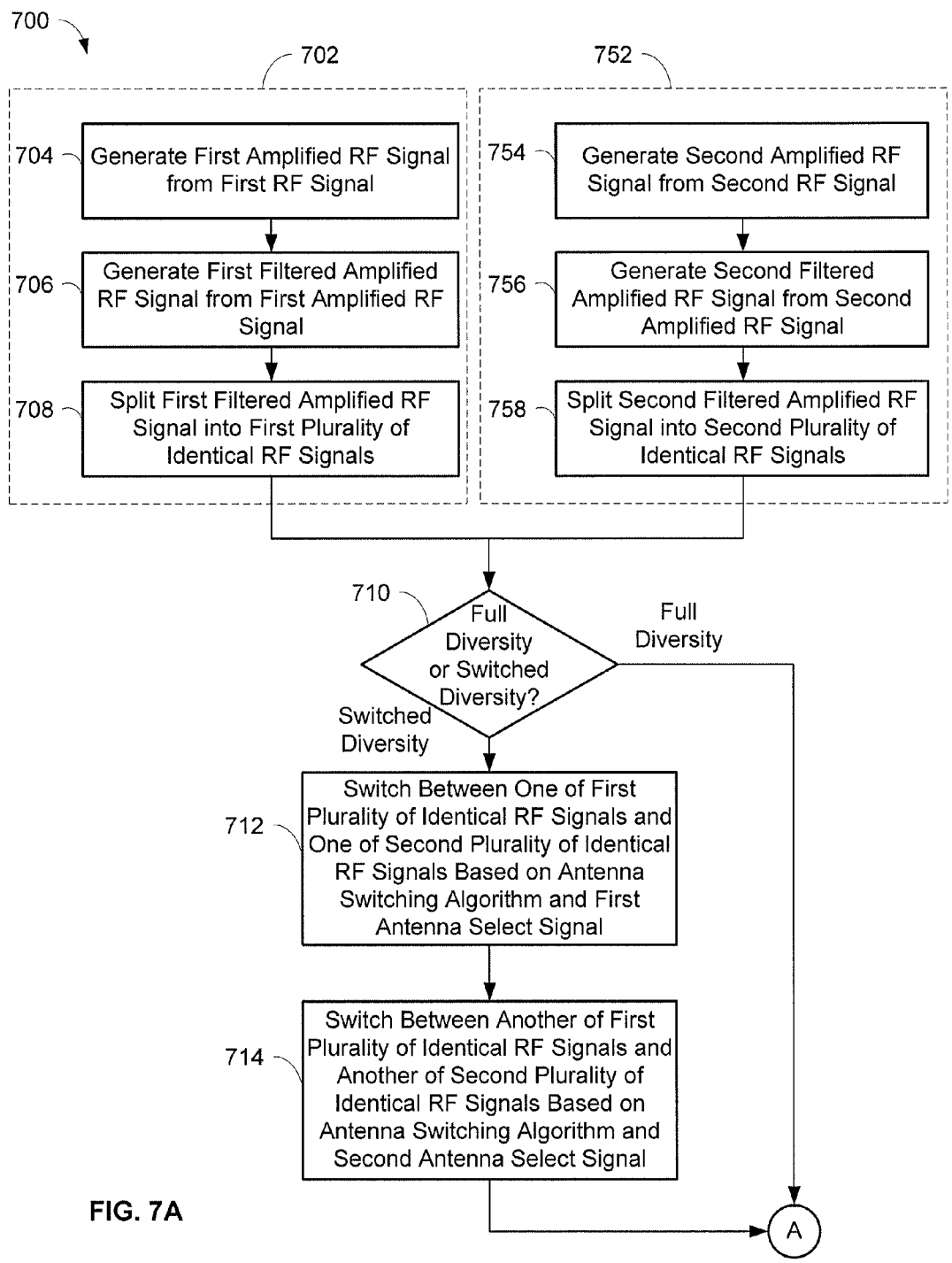
FIGS. 7A-7B are flowcharts illustrating operations for generating passband modulated signals in conjunction with the operations of FIG. 6, in accordance with some embodiments.
Figure 7B:
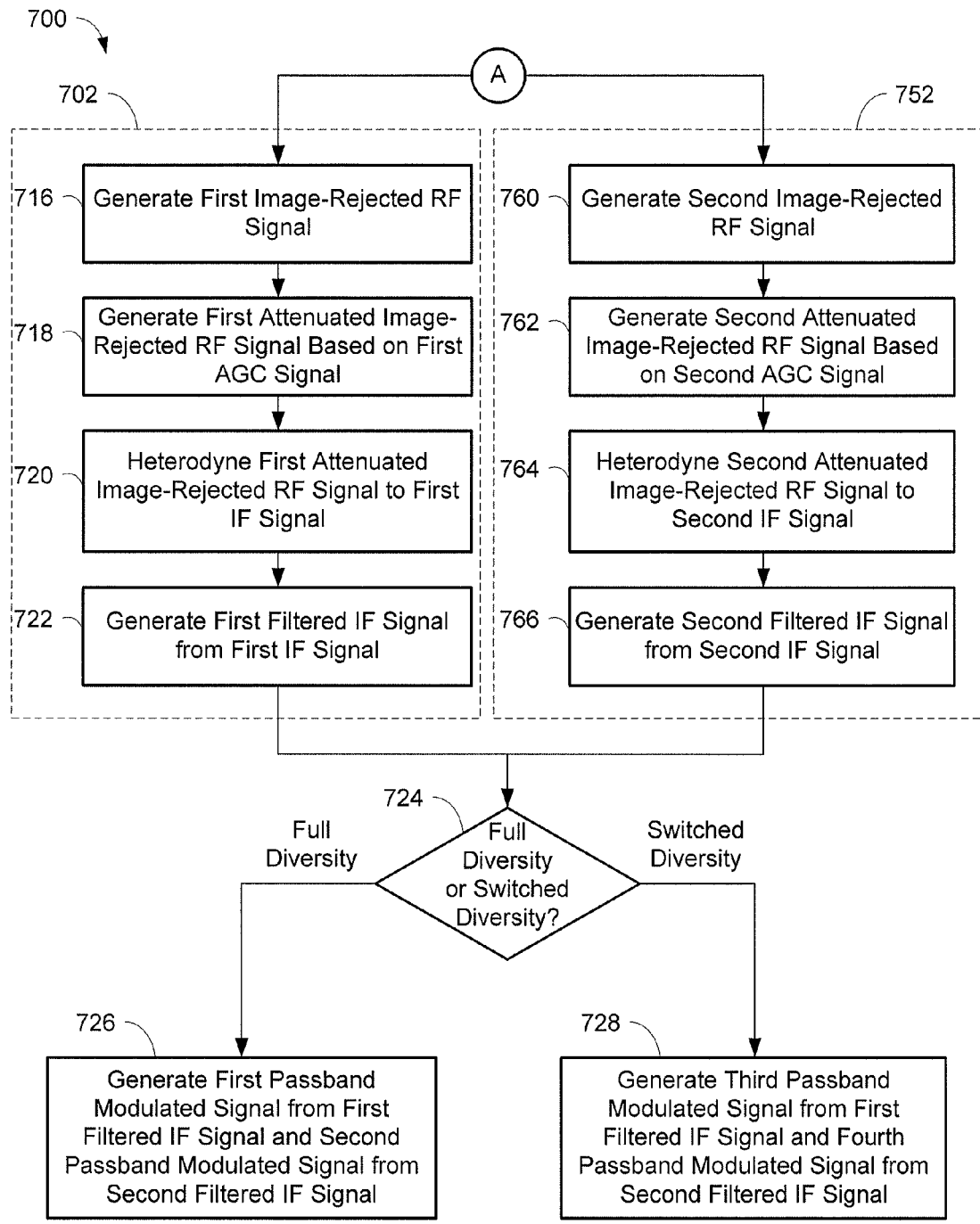

FIGS. 7A-7B show an embodiment of a process 700 for generating passband modulated signals from received RF signals in conjunction with the process 600 of FIG. 6. The process 700 may include embodiments of the steps 610, 614, 620, 622, and 624, as described above. As discussed above, the wireless audio receiver may operate in full diversity mode when receiving a single RF signal or switched diversity mode when receiving two RF signals. Block 702 of the process 700 may correspond to steps 610 or 622 of the process 600 that respectively generates a first passband modulated signal based on a single RF signal in full diversity mode, or generates a third passband modulated signal based on a first RF signal in switched diversity mode. Similarly, block 752 of the process 700 may correspond to steps 614 or 624 of the process 600 that respectively generates a second passband modulated signal based on the single RF signal in full diversity mode, or generates a fourth passband modulated signal based on a second RF signal in switched diversity mode. Blocks 702 and 752 may include steps that are performed by first and second parallel RF signal processing paths, respectively.

In the block 702, a first amplified RF signal may be generated at step 704 from the single RF signal, if in full diversity mode, or the first RF signal, if in switched diversity mode. A low noise amplifier may generate the first amplified RF signal, for example. At step 706, a first filtered amplified RF signal may be generated from the first amplified RF signal. A bandpass filter may generate the first filtered amplified RF signal, for example. The first filtered amplified RF signal may be split at step 708 into a first plurality of identical signals, such as by an RF splitter. Similarly, in the block 752, a second amplified RF signal may be generated at step 754 from the single RF signal, if in full diversity mode, or the second RF signal, if in switched diversity mode. A low noise amplifier may generate the second amplified RF signal, for example. At step 756, a second filtered amplified RF signal may be generated from the second amplified RF signal. A bandpass filter may generate the second filtered amplified RF signal, for example. The second filtered amplified RF signal may be split at step 758 into a second plurality of identical signals, such as by an RF splitter.

At step 710, if the wireless audio receiver is in switched diversity mode, the process 700 may continue to step 712. At step 712, an RF switch in the first RF signal processing path, for example, may switch between one of the first plurality of identical RF signals generated at step 708 and one of the second plurality of identical RF signals generated at step 758. The switching at step 712 may be based on an antenna switching algorithm and a first antenna select signal. An RF switch in the second RF signal processing path, for example, may switch at step 714 between another of the first plurality of identical RF signals generated at step 708 and another of the second plurality of identical RF signals generated at step 758. The switching at step 714 may also be based on the antenna switching algorithm and a second antenna select signal. By intelligently switching between the RF signals received, the process 700 can take advantage of receiving the RF signals at both diversity antennas when in switched diversity mode. Following step 714, or if the wireless audio receiver is in full diversity mode at step 710, the process 700 may continue as shown in FIG. 7B, as denoted by off-page reference A.

As shown in FIG. 7B, the process 700 may continue from off-page reference A after having generated filtered amplified RF signals. Blocks 702 and 752 are continued in FIG. 7B to show steps that are performed by first and second parallel RF signal processing paths, respectively. At step 716, a first image-rejected RF signal may be generated from a filtered amplified RF signal. In parallel, at step 760, a second image-rejected RF signal may be generated from a filtered amplified RF signal. The image-rejected RF signals may be generated by tunable image reject filters, for example. At step 718, a first attenuated image-rejected RF signal may be generated based on a first AGC signal, and in parallel, at step 762, a second attenuated image-rejected RF signal may be generated based on a second AGC signal. The attenuated image-rejected RF signals may be generated by variable attenuators, and the AGC signals may have been generated from a DSP module, for example.

The first attenuated image-rejected RF signal may be heterodyned to a first IF signal at step 720, and in parallel, at step 764, the second attenuated image-rejected RF signal may be heterodyned to a second IF signal. Mixers may heterodyne the attenuated image-rejected RF signals to the IF signals, for example. At step 722, the first IF signal may be used to generate a first filtered IF signal from the first IF signal, and in parallel, at step 766, the second IF signal may be used to generate a second filtered IF signal from the second IF signal. At step 724, if the wireless audio receiver is in full diversity mode, the process 700 may continue to step 726. At step 726, a first passband modulated signal may be generated from the first filtered IF signal generated at step 722 and a second passband modulated signal may be generated from the second filtered IF signal generated at step 766. However, if the wireless audio receiver is in switched diversity mode at step 724, then the process 700 may continue to step 728. At step 728, a third passband modulated signal may be generated from the first filtered IF signal generated at step 722 and a fourth passband modulated signal may be generated from the second filtered IF signal generated at step 766. IF filters, such as narrowband SAW filters, and IF amplifiers may be used to generate the filtered IF signals and passband modulated signals, for example.

Figure 8A:
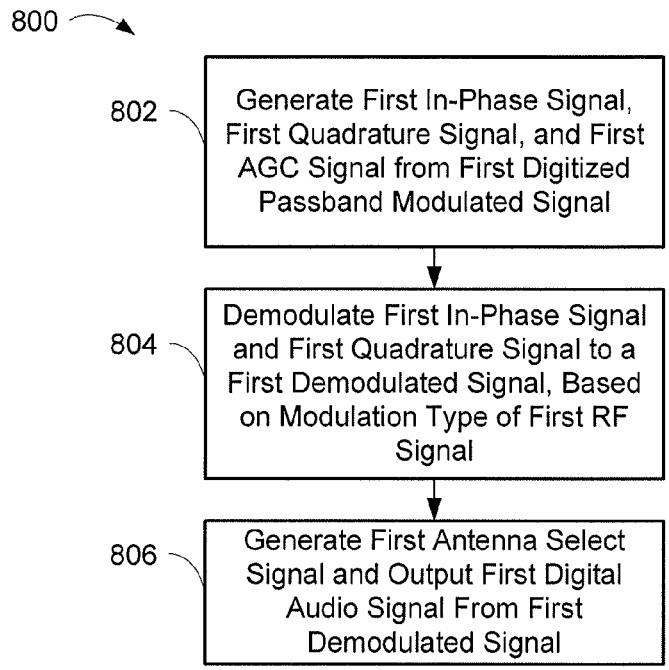
FIGS. 8A-8B are flowcharts illustrating an embodiment of operations for demodulating digitized passband modulated signals and generating digital audio signals in conjunction with the operations of FIG. 6, in accordance with some embodiments.
Figure 8B:
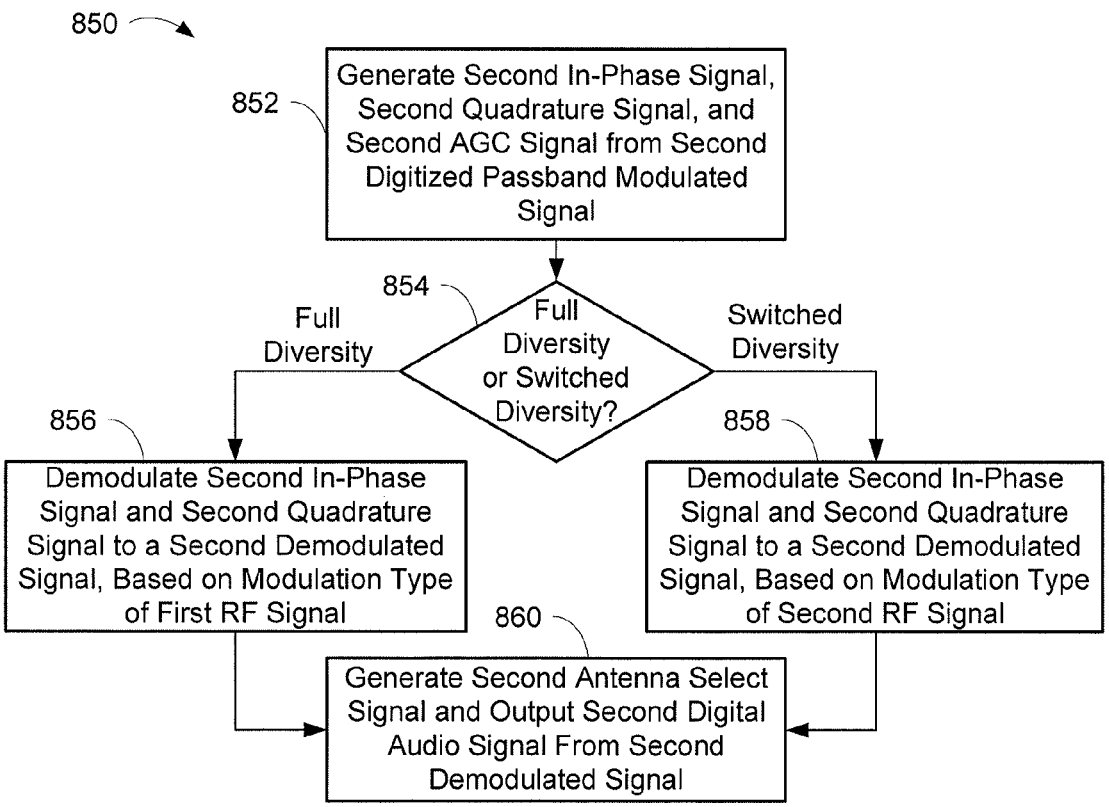

FIGS. 8A-8B show embodiments of processes 800 and 850 for demodulating digitized passband modulated signals and generating digital audio signals in conjunction with the process 600 of FIG. 6. The processes of FIGS. 8A and 8B may be performed in DSP modules, for example, and may include steps that are performed in parallel. In these embodiments, multiple demodulation modules may each include circuitry specific to demodulating signals that have been modulated using particular analog and/or digital modulation schemes. The process 800 shown in FIG. 8A may correspond to the step 630 in the process 600. At step 802, a first in-phase (I) signal, a first quadrature (Q) signal, and a first AGC signal may be generated from a first digitized passband modulated signal. The first digitized passband modulated signal may have been generated by an ADC, for example. Generation of the first I signal, the first Q signal, and the first AGC signal may be by a digital down converter, in some embodiments. The I and Q signals may be a basebanded complex signal centered at zero frequency that decimates the digitized passband modulated signal to a lower sampling rate.

At step 804, the first I signal and the first Q signal may be demodulated to a first demodulated signal, based on the modulation type of the RF signal. Each of the demodulation modules may attempt to demodulate the first I signal and the first Q signal, but at step 806, a first digital audio signal may be output from the first demodulated signal of the appropriate demodulation module. A first antenna select signal may also be generated at step 806 based on the first demodulated signal. For example, at step 806, the modulation type of the RF signal may be used as a select signal to a multiplexer unit that selects the demodulated signal and the first antenna select signal from the appropriate demodulation module.

The process 850 shown in FIG. 8B may correspond to the step 632 in the process 600. At step 852, a second in-phase (I) signal, a second quadrature (Q) signal, and a second AGC signal may be generated from a second digitized passband modulated signal. The second digitized passband modulated signal may have been generated by an ADC, for example. Generation of the second I signal, the second Q signal, and the second AGC signal may be by a digital down converter, in some embodiments. If the wireless audio receiver is in full diversity mode at step 854, then at step 856, the second I signal and the second Q signal may be demodulated to a second demodulated signal, based on the modulation type of the first RF signal. However, if the wireless audio receiver is in switched diversity mode at step 854, then at step 858, the second I signal and the second Q signal may be demodulated to a second demodulated signal, based on the modulation type of the second RF signal. As described above with respect to FIG. 8A, multiple demodulation modules may include modulation-specific circuitry to demodulate the I and Q signals. At step 860, a second digital audio signal may be output from the second demodulated signal of the appropriate demodulation module, and also to generate a second antenna select signal.

If in full diversity mode, a single digital audio signal may be generated from the first and second digitized passband modulated signals. For example, the digital audio signals may be combined, summed, and/or otherwise processed to account for the diversity effects of the RF signal being received at the diversity antennas, and the single digital audio signal may be generated. In some embodiments, the digitized passband modulated signals, e.g., prior to demodulation, may be processed to account for the diversity effects. As such, one digital audio signal may be generated that is based on the first and/or second demodulated signals, and/or based on the first and/or second I and Q signals.

Figure 9A:
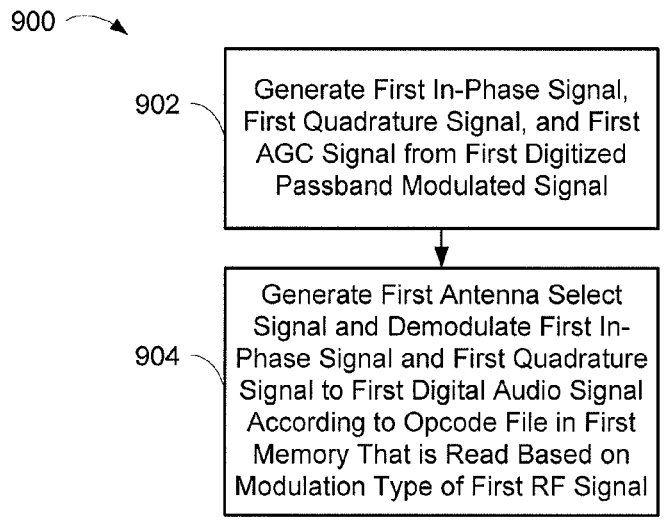
FIGS. 9A-9B are flowcharts illustrating another embodiment of operations for demodulating digitized passband modulated signals and generating digital audio signals in conjunction with the operations of FIG. 6, in accordance with some embodiments.
Figure 9B:
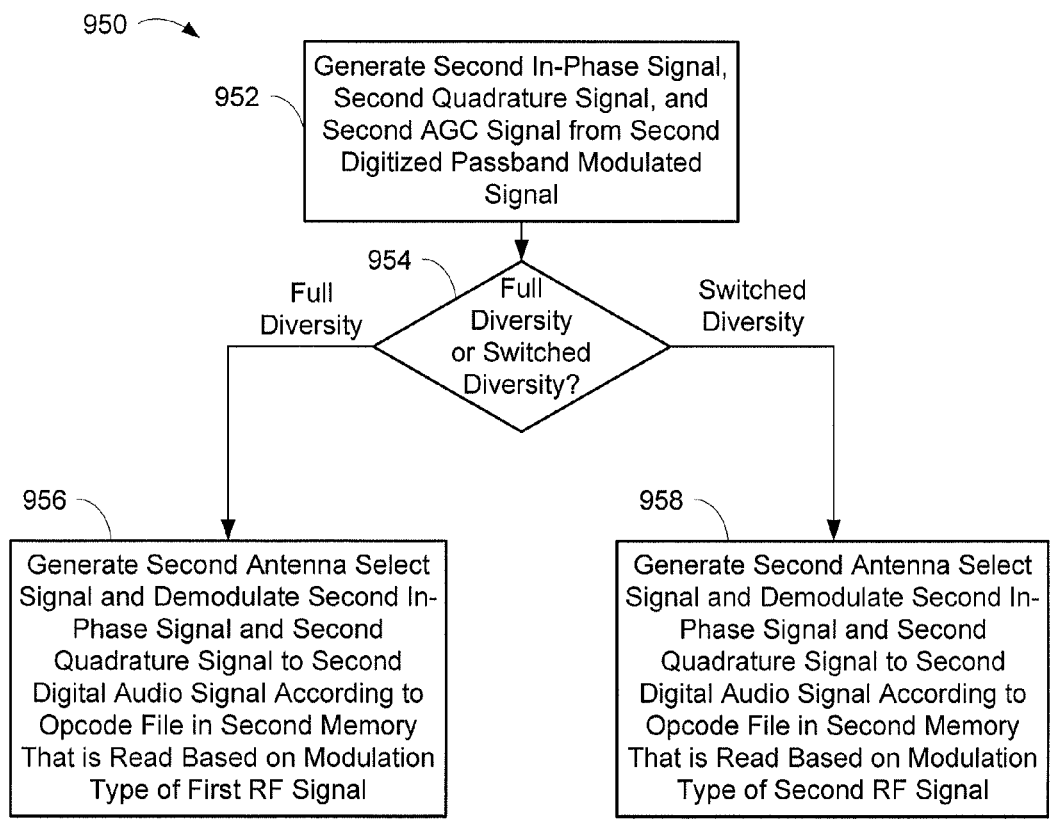

FIGS. 9A-9B show other embodiments of processes 900 and 950 for demodulating digitized passband modulated signals and generating digital audio signals in conjunction with the process 600 of FIG. 6. The processes of FIGS. 9A and 9B may be performed in DSP modules, for example, and may include steps that are performed in parallel. In these embodiments, a DSP processing engine may be utilized to demodulate the signals according to commands in opcode files stored in a memory. Each of the opcode files may be specific to demodulating signals that have been modulated using a specific modulation scheme. The process 900 shown in FIG. 9A may correspond to the step 630 in the process 600.

At step 902, a first in-phase (I) signal, a first quadrature (Q) signal, and a first AGC signal may be generated from a first digitized passband modulated signal. The first digitized passband modulated signal may have been generated by an ADC, for example. Generation of the first I signal, the first Q signal, and the first AGC signal may be by a digital down converter, in some embodiments. The I and Q signals may be a basebanded complex signal centered at zero frequency that decimates the digitized passband modulated signal to a lower sampling rate. At step 904, the first I signal and the first Q signal may be demodulated to a first digital audio signal according to commands in an appropriate opcode file.

The appropriate opcode file may be read from the memory based on the modulation type of the first RF signal. An antenna select signal may also be generated at step 904 from the first I and Q signals.

The process 950 shown in FIG. 9B may correspond to the step 632 in the process 600. At step 952, a second in-phase (I) signal, a second quadrature (Q) signal, and a second AGC signal may be generated from a second digitized passband modulated signal. The second digitized passband modulated signal may have been generated by an ADC, for example. Generation of the second I signal, the second Q signal, and the second AGC signal may be by a digital down converter, in some embodiments. If the wireless audio receiver is in full diversity mode at step 954, then at step 956, the second I signal and the second Q signal may be demodulated to a second digital audio signal according to commands in an appropriate opcode file. The appropriate opcode file may be read from the memory based on the modulation type of the first RF signal. An antenna select signal may also be generated at step 956 from the first I and Q signals. However, if the wireless audio receiver is in switched diversity mode at step 954, then at step 958, the second I signal and the second Q signal may be demodulated to a second digital audio signal according to commands in an appropriate opcode file. The appropriate opcode file may be read from the memory based on the modulation type of the second RF signal.

If in full diversity mode, a single digital audio signal may be generated from the first and second digitized passband modulated signals. For example, the digital audio signals may be combined, summed, and/or otherwise processed to account for the diversity effects of the RF signal being received at the diversity antennas, and the single digital audio signal may be generated. In some embodiments, the digitized passband modulated signals, e.g., prior to demodulation, may be processed to account for the diversity effects. As such, one digital audio signal may be generated that is based on the first and/or second demodulated signals, and/or based on the first and/or second I and Q signals.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A wireless audio receiver system, comprising:
(A) a first diversity antenna and a second diversity antenna for receiving one or more of a first radio frequency (RF) signal and a second RF signal, each of the first and second RF signals containing an audio signal modulated using an analog modulation scheme or a digital modulation scheme;
(B) an RF analog signal processing module in communication with the first and second diversity antennas, the RF analog signal processing module comprising a first RF signal processing path, a second RF signal processing path, and an antenna routing module, wherein the first and second RF signal processing paths and the antenna routing module are configured, based on a user setting that denotes a modulation type of the first and second RF signals and a configuration to full diversity mode or switched diversity mode, such that:
if the user setting denotes the configuration to full diversity mode, the antenna routing module routes the first RF signal to the first RF signal processing path and the second RF signal processing path, wherein the first RF signal processing path generates a first passband modulated signal based on the first RF signal and the second RF signal processing path generates a second passband modulated signal based on the first RF signal; or
if the user setting denotes the configuration to switched diversity mode, the antenna routing module switches between the first and second diversity antennas to respectively route the first and second RF signals to the first and second RF signal processing paths based on an antenna switching algorithm, wherein the first RF signal processing path generates a third passband modulated signal based on the first RF signal and the second RF signal processing path generates a fourth passband modulated signal based on the second RF signal;
(C) a first analog to digital converter (ADC) and a second ADC in communication with the RF analog signal processing module, wherein:
if the user setting denotes the configuration to full diversity mode:
the first ADC is for passband sampling the first passband modulated signal to generate a first digitized passband modulated signal; and
the second ADC is for passband sampling the second passband modulated signal to generate a second digitized passband modulated signal; and
if the user setting denotes the configuration to switched diversity mode:
the first ADC is for passband sampling the third passband modulated signal to generate the first digitized passband modulated signal; and
the second ADC is for passband sampling the fourth passband modulated signal to generate the second digitized passband modulated signal;
(D) a first digital signal processing (DSP) module in communication with the first ADC and a second DSP module in communication with the second ADC, wherein:
the first DSP module demodulates the first digitized passband modulated signal, based on the user setting, to generate a first digital audio signal; and
the second DSP module demodulates the second digitized passband modulated signal, based on the user setting, to generate a second digital audio signal;
(E) a first digital to analog converter (DAC) in communication with the first DSP module and a second DAC in communication with the second DSP module, wherein:
the first DAC generates a first analog audio signal from the first digital audio signal; and
the second DAC generates a second analog audio signal from the second digital audio signal.

2. The wireless audio receiver system of claim 1, wherein:
the first RF signal processing path comprises a first low noise amplifier for generating a first amplified RF signal from the first RF signal, and a first RF bandpass filter for generating a first filtered amplified RF signal from the first amplified RF signal;
the second RF signal processing path comprises a second low noise amplifier for generating a second amplified RF signal from the second RF signal, and a second RF bandpass filter for generating a second filtered amplified RF signal from the second amplified RF signal; and
the antenna routing module comprises:
  a first RF splitter for splitting the first filtered amplified RF signal into a first plurality of identical RF signals;
  a second RF splitter for splitting the second filtered amplified RF signal into a second plurality of identical RF signals;
  a first RF switch for switching between one of the first plurality of identical RF signals and one of the second plurality of identical RF signals, based on the antenna switching algorithm, if the user setting denotes the configuration to switched diversity mode; and
  a second RF switch for switching between another of the first plurality of identical RF signals and another of the second plurality of identical RF signals, based on the antenna switching algorithm, if the user setting denotes the configuration to switched diversity mode.

3. The wireless audio receiver system of claim 2, wherein:
the first RF signal processing path further comprises:
  a first tunable image reject filter in communication with the first RF switch, the first tunable image reject filter for generating a first image-rejected RF signal from one of the first plurality of identical RF signals or one of the second plurality of identical RF signals;
  a first variable attenuator in communication with the first tunable image reject filter, the first variable attenuator for generating a first attenuated image-rejected RF signal from the first image-rejected RF signal, based on a first automatic gain control (AGC) signal; and
  a first mixer in communication with the first variable attenuator, the first mixer for heterodyning the first attenuated image-rejected RF signal to a first intermediate frequency (IF) signal; and
the second RF signal processing path further comprises:
  a second tunable image reject filter in communication with the second RF switch, the second tunable image reject filter for generating a second image-rejected RF signal from another of the first plurality of identical RF signals or another of the second plurality of identical RF signals;
  a second variable attenuator in communication with the second tunable image reject filter, the second variable attenuator for generating a second attenuated image-rejected RF signal from the second image-rejected RF signal, based on a second AGC signal; and
  a second mixer in communication with the second variable attenuator, the second mixer for heterodyning the second attenuated image-rejected RF signal to a second IF signal.

4. The wireless audio receiver system of claim 3, wherein:
the first RF signal processing path further comprises:
  a first IF filter in communication with the first mixer for generating a first filtered IF signal from the first IF signal; and
  a first IF amplifier in communication with the first IF filter for generating the first passband modulated signal from the first filtered IF signal, if the user setting denotes the configuration to full diversity mode, or for generating the third passband modulated signal from the first filtered IF signal, if the user setting denotes the configuration to switched diversity mode; and
the second RF signal processing path further comprises:
  a second IF filter in communication with the second mixer for generating a second filtered IF signal from the second IF signal; and
  a second IF amplifier in communication with the second IF filter for generating the second passband modulated signal from the second filtered IF signal, if the user setting denotes the configuration to full diversity mode, or for generating the fourth passband modulated signal from the second filtered IF signal, if the user setting denotes the configuration to switched diversity mode.

5. The wireless audio receiver system of claim 4, wherein each of the first and second IF filters comprises a narrowband surface acoustic wave (SAW) filter.

6. The wireless audio receiver system of claim 3, wherein:
the first DSP module comprises:
  a first digital down converter for generating a first in-phase signal, a first quadrature signal, and the first AGC signal from the first digitized passband modulated signal;
  a first plurality of demodulation modules in communication with the first digital down converter, wherein each of the first plurality of demodulation modules is for demodulating the first in-phase signal and the first quadrature signal to one of a first plurality of demodulated signals based on the modulation type of the first RF signal, and for generating a first antenna select signal; and
  a first multiplexer unit in communication with the first plurality of demodulation modules, the first multiplexer unit for outputting the first digital audio signal from one of the first plurality of demodulated signals, based on the user setting;
the first RF switch switches between one of the first plurality of identical RF signals and one of the second plurality of identical RF signals, based on the first antenna select signal;
the second DSP module comprises:
  a second digital down converter for generating a second in-phase signal, a second quadrature signal, and the second AGC signal from the second digitized passband modulated signal;
  a second plurality of demodulation modules in communication with the second digital down converter, wherein each of the second plurality of demodulation modules is for demodulating the second in-phase signal and the second quadrature signal to one of a second plurality of demodulated signals based on the modulation type of the first RF signal, if the user setting denotes the configuration to full diversity mode, and based on the modulation type of the second RF signal, if the user setting denotes the configuration to switched diversity mode, and for generating a second antenna select signal; and a second multiplexer unit in communication with the second plurality of demodulation modules, the second multiplexer unit outputting the second digital audio signal from one of the second plurality of demodulated signals, based on the user setting; and the second RF switch switches between another of the first plurality of identical RF signals and another of the second plurality of identical RF signals, based on the second antenna select signal.

7. The wireless audio receiver system of claim 3, wherein:
the first DSP module comprises:
- a first digital down converter for generating a first in-phase signal, a first quadrature signal, and the first AGC signal from the first digitized passband modulated signal;
- a first memory for storing a first plurality of opcode files, wherein each of the first plurality of opcode files comprises commands to demodulate the first in-phase signal and the first quadrature signal; and
- a first DSP processing engine in communication with the first digital down converter and the first memory, the first DSP processing engine for generating a first antenna select signal and demodulating the first in-phase signal and the first quadrature signal to the first digital audio signal according to one of the first plurality of opcode files, the one of the first plurality of opcode files read from the first memory based on the modulation type of the first RF signal;

the first RF switch switches between one of the first plurality of identical RF signals and one of the second plurality of identical RF signals, based on the first antenna select signal;

the second DSP module comprises:
- a second digital down converter for generating a second in-phase signal, a second quadrature signal, and the second AGC signal from the second digitized passband modulated signal;
- a second memory for storing a second plurality of opcode files, wherein each of the second plurality of opcode files comprises commands to demodulate the second in-phase signal and the second quadrature signal; and
- a second DSP processing engine in communication with the second digital down converter and the second memory, the second DSP processing engine for generating a second antenna select signal and demodulating the second in-phase signal and the second quadrature signal to the second digital audio signal according to one of the second plurality of opcode files, the one of the second plurality of opcode files read from the second memory based on the modulation type of the first RF signal, if the user setting denotes the configuration to full diversity mode, and based on the modulation type of the second RF signal, if the user setting denotes the configuration to switched diversity mode; and the second RF switch switches between another of the first plurality of identical RF signals and another of the second plurality of identical RF signals, based on the second antenna select signal.

8. The wireless audio receiver system of claim 1, further comprising an interface module configured to connect with a cable adapted to simultaneously transport a combined digital audio signal, a DC power, and a data signal, wherein the interface module is configured to:

generate and transmit the combined digital audio signal comprising one or more of the first and second digital audio signals;

receive and provide the DC power to the RF analog signal processing module, the first and second ADCs, the first and second DSP modules, and the first and second DACs; and transceive the data signal, the data signal comprising one or more of a command or a status.

9. The wireless audio receiver system of claim 1, further comprising a first audio analog signal processing module in communication with the first DAC and a second audio analog signal processing module in communication with the second DAC, wherein:
- the first audio analog signal processing module generates a first processed analog audio signal from the first analog audio signal; and
- the second audio analog signal processing module generates a second processed analog audio signal from the second analog audio signal.

10. The wireless audio receiver system of claim 8, wherein the combined digital audio signal conforms to an AES3 standard.

11. A method of wirelessly receiving one or more of a first radio frequency (RF) signal and a second RF signal, each of the first and second RF signals containing an audio signal modulated using an analog modulation scheme or a digital modulation scheme, the method comprising:

(A) receiving the one or more of the first and second RF signals;

(B) receiving a user setting to denote a modulation type of the first and second RF signals and a configuration to full diversity mode or switched diversity mode of a first RF signal processing path and a second RF signal processing path;

(C) if the user setting denotes the configuration to full diversity mode:
- routing the first RF signal to the first and second RF signal processing paths;
- generating a first passband modulated signal with the first RF signal processing path based on the first RF signal;
- generating a second passband modulated signal with the second RF signal processing path based on the first RF signal;
- passband sampling the first passband modulated signal to generate a first digitized passband modulated signal; and
- passband sampling the second passband modulated signal to generate a second digitized passband modulated signal;

(D) if the user setting denotes the configuration to switched diversity mode:
- switching between the first and second diversity antennas to respectively route the first and second RF signals to the first and second RF signal processing paths based on an antenna switching algorithm;
- generating a third passband modulated signal with the first RF signal processing path based on the first RF signal;
- generating a fourth passband modulated signal with the second RF signal processing path based on the second RF signal;
- passband sampling the third passband modulated signal to generate the first digitized passband modulated signal; and passband sampling the fourth passband modulated signal to generate the second digitized passband modulated signal;
(E) demodulating the first digitized passband modulated signal, based on the user setting, to generate a first digital audio signal;
(F) demodulating the second digitized passband modulated signal, based on the user setting, to generate a second digital audio signal;
(G) generating a first analog audio signal from the first digital audio signal; and
(H) generating a second analog audio signal from the second digital audio signal.

12. The method of claim 11, wherein:
generating the first passband modulated signal and generating the third passband modulated signal each comprises:
  generating a first amplified RF signal from the first RF signal;
  generating a first filtered amplified RF signal from the first amplified RF signal; and
  splitting the first filtered amplified RF signal into a first plurality of identical RF signals;
generating the second passband modulated signal and generating the fourth passband modulated signal each comprises:
  generating a second amplified RF signal from the second RF signal;
  generating a second filtered amplified RF signal from the second amplified RF signal; and
  splitting the second filtered amplified RF signal into a second plurality of identical RF signals; and
if the user setting denotes the configuration to switched diversity mode:
  switching between one of the first plurality of identical RF signals and one of the second plurality of identical RF signals, based on the antenna switching algorithm; and
  switching between another of the first plurality of identical RF signals and another of the second plurality of identical RF signals, based on the antenna switching algorithm.

13. The method of claim 12, wherein:
generating the first passband modulated signal and generating the third passband modulated signal each further comprises:
  generating a first image-rejected RF signal from one of the first plurality of identical RF signals or one of the second plurality of identical RF signals;
  generating a first attenuated image-rejected RF signal from the first image-rejected RF signal, based on a first automatic gain control (AGC) signal; and
  heterodyning the first attenuated image-rejected RF signal to a first intermediate frequency (IF) signal; and
generating the second passband modulated signal and generating the fourth passband modulated signal each further comprises:
  generating a second image-rejected RF signal from another of the first plurality of identical RF signals or another of the second plurality of identical RF signals;
  generating a second attenuated image-rejected RF signal from the second image-rejected RF signal, based on a second AGC signal; and
  heterodyning the second attenuated image-rejected RF signal to a second IF signal.

14. The method of claim 13:
wherein generating the first passband modulated signal and generating the third passband modulated signal each further comprises generating a first filtered IF signal from the first IF signal;
wherein generating the second passband modulated signal and generating the fourth passband modulated signal further each comprises generating a second filtered IF signal from the second IF signal;
further comprising:
  if the user setting denotes the configuration to full diversity mode:
    generating the first passband modulated signal from the first filtered IF signal; and
    generating the second passband modulated signal from the second filtered IF signal; and
  if the user setting denotes the configuration to switched diversity mode:
    generating the third passband modulated signal from the first filtered IF signal; and
    generating the fourth passband modulated signal from the second filtered IF signal.

15. The method of claim 14, wherein:
generating the first filtered IF signal comprises generating the first filtered IF signal from the first IF signal with a first narrowband surface acoustic wave (SAW) filter; and
generating the second filtered IF signal comprises generating the second filtered IF signal from the second IF signal with a second narrowband SAW filter.

16. The method of claim 13, wherein:
demodulating the first digitized passband modulated signal comprises:
  generating a first in-phase signal, a first quadrature signal, and the first AGC signal from the first digitized passband modulated signal;
  demodulating the first in-phase signal and the first quadrature signal to a first demodulated signal based on the modulation type of the first RF signal; and
  generating a first antenna select signal and outputting the first digital audio signal from the first demodulated signal, based on the user setting;
switching between one of the first plurality of identical RF signals and one of the second plurality of identical RF signals comprises switching between one of the first plurality of identical RF signals and one of the second plurality of identical RF signals, based on the first antenna select signal;
demodulating the second digitized passband modulated signal comprises:
  generating a second in-phase signal, a second quadrature signal, and the second AGC signal from the second digitized passband modulated signal;
  demodulating the second in-phase signal and the second quadrature signal to a second demodulated signal based on the modulation type of the first RF signal, if the user setting denotes the configuration to full diversity mode, and based on the modulation type of the second RF signal, if the user setting denotes the configuration to switched diversity mode; and
  generating a second antenna select signal and outputting the second digital audio signal from the second demodulated signal, based on the user setting; and
switching between another of the first plurality of identical RF signals and another of the second plurality of identical RF signals comprises switching between another of the first plurality of identical RF signals and another of the second plurality of identical RF signals, based on the second antenna select signal.

17. The method of claim 13, wherein:
demodulating the first digitized passband modulated signal comprises:
  generating a first in-phase signal, a first quadrature signal, and the first AGC signal from the first digitized passband modulated signal; and
  generating a first antenna select signal and demodulating the first in-phase signal and the first quadrature signal to the first digital audio signal based on one of a first plurality of opcode files stored in a first memory, the one of the first plurality of opcode files read from the first memory based on the modulation type of the first RF signal, wherein each of the first plurality of opcode files comprises commands to demodulate the first in-phase signal and the first quadrature signal;
switching between one of the first plurality of identical RF signals and one of the second plurality of identical RF signals comprises switching between one of the first plurality of identical RF signals and one of the second plurality of identical RF signals, based on the first antenna select signal;
demodulating the second digitized passband modulated signal comprises:
  generating a second in-phase signal, a second quadrature signal, and the second AGC signal from the second digitized passband modulated signal; and
  generating a second antenna select signal and demodulating the second in-phase signal and the second quadrature signal to the second digital audio signal based on one of a second plurality of opcode files stored in a second memory, the one of the second plurality of opcode files read from the second memory based on the modulation type of the first RF signal, if the user setting denotes the configuration to full diversity mode, and based on the modulation type of the second RF signal, if the user setting denotes the configuration to switched diversity mode, wherein each of the second plurality of opcode files comprises commands to demodulate the second in-phase signal and the second quadrature signal; and
switching between another of the first plurality of identical RF signals and another of the second plurality of identical RF signals comprises switching between another of the first plurality of identical RF signals and another of the second plurality of identical RF signals, based on the second antenna select signal.

18. The method of claim 11, further comprising generating and transmitting a combined digital audio signal comprising one or more of the first and second digital audio signals, receiving a DC power, and transceiving a data signal on an interface jack configured to connect with a cable adapted to simultaneously transport the combined digital audio signal, the DC power, and the data signal, wherein the data signal comprises one or more of a command or a status.

19. The method of claim 11, further comprising:
  generating a first processed analog audio signal from the first analog audio signal; and
  generating a second processed analog audio signal from the second analog audio signal.

20. The method of claim 18, wherein the combined digital audio signal conforms to an AES3 standard.

* * * * *